(12) United States Patent
Ito

(10) Patent No.: US 7,760,881 B2
(45) Date of Patent: Jul. 20, 2010

(54) DATA PROCESSING APPARATUS AND DATA RECEPTION PROCESSING APPARATUS

(75) Inventor: Osamu Ito, Tokyo (JP)

(73) Assignee: Sony Corporation (JP)

( * ) Notice: Subject to any disclaimer, the term of this patent is extended or adjusted under 35 U.S.C. 154(b) by 907 days.

(21) Appl. No.: 10/529,164

(22) PCT Filed: Oct. 21, 2003

(86) PCT No.: PCT/JP03/13436

§ 371 (c)(1),
(2), (4) Date: Mar. 24, 2005

(87) PCT Pub. No.: WO2004/040837

PCT Pub. Date: May 13, 2004

(65) Prior Publication Data

US 2006/0041576 A1    Feb. 23, 2006

(30) Foreign Application Priority Data

Oct. 31, 2002 (JP) .......................... P2002-318579

(51) Int. Cl.
*H04K 1/00* (2006.01)
*H04L 9/00* (2006.01)
(52) U.S. Cl. .......................... 380/268; 380/28; 380/255
(58) Field of Classification Search ............. 380/28–29, 380/44, 46–47, 255, 268
See application file for complete search history.

(56) References Cited

U.S. PATENT DOCUMENTS

| | | | | |
|---|---|---|---|---|
| 3,784,743 A | * | 1/1974 | Schroeder | 380/46 |
| 4,713,605 A | * | 12/1987 | Iyer et al. | 324/73.1 |
| 4,827,514 A | * | 5/1989 | Ziolko et al. | 380/268 |
| 5,195,136 A | * | 3/1993 | Hardy et al. | 380/43 |
| 5,530,959 A | * | 6/1996 | Amrany | 380/268 |
| 5,535,239 A | * | 7/1996 | Padovani et al. | 370/209 |
| 5,787,179 A | | 7/1998 | Ogawa et al. | |
| 6,201,870 B1 | * | 3/2001 | Medard et al. | 380/46 |
| 7,113,592 B1 | * | 9/2006 | Schaefer-Lorinser et al. | 380/28 |
| 7,336,783 B2 | * | 2/2008 | Park | 380/28 |
| 2003/0161467 A1 | * | 8/2003 | Cheng et al. | 380/44 |

FOREIGN PATENT DOCUMENTS

JP    02-249333 A    10/1990

(Continued)

*Primary Examiner*—Kimyen Vu
*Assistant Examiner*—Darren Schwartz
(74) *Attorney, Agent, or Firm*—Lerner, David, Littenberg, Krumholz & Mentlik, LLP

(57) ABSTRACT

The present invention is directed to a data processing apparatus adapted for performing scramble processing of transmit data, which comprises cyclic code generating means for generating cyclic bit data train of a predetermined period, EXOR operation means for sequentially performing EXOR operation of the cyclic bit data train with respect to the transmit data to output scramble-processed data, data generating means for generating bit data of a predetermined pattern, and switching means supplied with the scramble-processed data and the bit data of the predetermined pattern generated by the data generating means to select the bit data of the predetermined pattern at the time of synchronization processing of the transmit data, and to select the scramble-processed data when synchronization processing of transmit data is not performed to output the data thus selected as scrambler output data.

6 Claims, 8 Drawing Sheets

FOREIGN PATENT DOCUMENTS

| | | | |
|---|---|---|---|
| JP | 02249333 | * | 10/1990 |
| JP | 08-204613 | A | 8/1996 |
| JP | 9-162859 | A | 6/1997 |
| JP | 2000-358024 | A | 12/2000 |
| JP | 2001-86110 | A | 3/2001 |

* cited by examiner

DATA PROCESSING APPARATUS AND DATA RECEPTION PROCESSING APPARATUS

CROSS-REFERENCE TO RELATED APPLICATIONS

The present application claims priority from Japanese Patent Application No. JP 2002-318579, filed in the Japanese Patent Office on Oct. 31, 2002, the entire content of which is incorporated herein by reference.

TECHNICAL FIELD

The present invention relates to a data processing apparatus adapted for performing scramble processing of transmit data and a data reception processing apparatus adapted for performing descramble processing of receive data, and more particularly to a data processing apparatus and a data reception processing apparatus which employ the scramble system and the descramble system of the self-synchronization type.

BACKGROUND ART

Communication systems of scrambling/descrambling data subject to transmission with a view to preventing the same data patterns from being repeatedly produced in transmission data, etc. for encrypting data subject to transmission, and/or realizing improvement in disturbance (interference) proof characteristic, etc. are widely employed in various communication systems. In order to use such scramble/descramble system, it is necessary to realize matching between data exerted for the purpose of performing scramble processing in transmitting unit and data exerted for performing descramble processing in receiving unit, i.e., to take synchronization between the transmitting unit and the receiving unit with respect to arbitrary data subject to transmission. As a method of taking synchronization, there are used a method of prescribing scramble pattern (descramble pattern) in advance, etc., and/or a method of performing transmission of information for prescribing scramble pattern in the state where those information are disposed (assigned) at predetermined positions of transmission data, etc.

Particularly, in using the scramble/descramble system for preventing the same data patterns from repeatedly taking place within transmission data, there are many cases where widely used PN series are used as scramble pattern.

FIG. 1 is a view showing one example of a data scrambler adapted for outputting PN series. In FIG. 1, reference numeral 101 indicates a shift register of 4 (four) bits, reference numeral 102 indicates a shift register of 3 (three) bits, reference numeral 103 indicates a modulo-2 adder supplied with bit data X7 and bit data X4 to perform Exclusive OR (hereinafter referred to as EXOR) operation, and reference numeral 104 indicates a modulo-2 adder supplied with output data of the adder 103 and data subject to scramble (descramble) processing to perform EXOR operation. In addition, output data of the adder 103 is inputted to the shift register 101, and output data of the shift register 101 is inputted to the shift register 102. Namely, a shift register of 7 (seven) bits operative to sequentially shift output data of the adder 103 is composed of the shift register 101 and the shift register 102. When such a configuration is employed, the data scrambler shown in FIG. 1 outputs random bit data train at period of 127 (27-1) bits thus to operate as pseudo-random number generating circuit.

In performing scramble/descramble system by using data scrambler which outputs PN series in a manner as described above, there is used data scrambler as shown in FIG. 1 which essentially has the same configuration as scrambler ordinarily provided at transmitting unit and descrambler ordinarily provided at receiving unit. The scrambler and the descrambler are caused to be of the same configuration, thereby making it possible to relatively easily construct self-synchronization type communication system which includes information for prescribing scramble pattern into transmission data to thereby take synchronization between the transmitting unit and the receiving unit. In view of the fact that, e.g., EXOR operation value according to bit data X and "0" results in bit data X itself, communication system is controlled such that "0" (zeros) are successively inputted by a predetermined number of bits with respect to the scrambler, and scrambler output data are sequentially outputted to a shift register having a predetermined number of bits which is provided within descrambler. Thus, the same bit data are sequentially and successively inputted, by a predetermined number of bits, to the shift register having a predetermined number of bits which constitutes the scrambler and the shift register having a predetermined number of bits which constitutes the descrambler. From this fact, after "0" are successively inputted to the scrambler by a predetermined number of bits, the same bit data trains are respectively stored into the shift register of the scrambler and the shift register of the descrambler. Thus, synchronization is taken (established) between the transmitting unit and the receiving unit.

FIG. 2 is a view showing the configuration of a conventional descrambler. It is to be noted that since common reference numerals are respectively attached to components common to those of FIG. 1 in FIG. 2, the detailed explanation thereof will be omitted.

In FIG. 2, reference numeral 105 indicates a switch supplied with data inputted to the descrambler and output data from the adder 103 to selectively output either one of data to the shift register 101. The switch 105 performs switching control so that transmission data inputted to the descrambler is inputted to the shift register 101 for a time period during which there is performed transmission of data obtained as the result of the fact that "0" successive by 7 (seven) bits are inputted to the scrambler to perform scramble processing with respect to the data. In this instance, output data of the scrambler respectively obtained with respect to "0" of 7 (seven) bits inputted to the scrambler, i.e., output data of the adder 103 within the scrambler are sequentially inputted to the shift register 101 of the descrambler. Thus, at the time point when output data of the scrambler with respect to "0" of the seventh bit is inputted to the shift register 101 of the descrambler, bit data train stored into the shift register of 7 (seven) bits within the scrambler and bit data train stored into the shift register of 7 (seven) bits within the descrambler are equal to each other. Thus, synchronization is taken (established). Thereafter, the switch 105 is switched so that data outputted from the adder 103 is inputted to the shift register 101. After synchronization is taken, the same scramble pattern is exerted, in the scrambler and the descrambler, on data subject to transmission. Accordingly, data transmission using the scramble/descramble system is performed.

Meanwhile, in IEEE802.11 given as standard for the purpose of realizing standardization according to packet transmission of wireless LAN, etc., it is prescribed that there should be employed the configuration adapted for successively inputting "0" by a predetermined number of bits to the scrambler at the header portion of packet in order to synchronize the descrambler of the receiving unit with the scrambler of the transmitting unit. FIG. 3 is a view showing frame structure prescribed in the IEEE802.11. In FIG. 3, "PCLP Preamble" field is used for taking frame synchronization, "SIGNAL" field is used for notifying transmission speed and/or modulation system, etc., and "SERVICE" field is used for synchronizing the descrambler with the scrambler. In "SERVICE" field, "Scrambler Initialization" consisting of the first half 7 (seven) bits all take values of "0" in order to take (establish) synchronization between the scrambler and the descrambler. Moreover, with respect to "Reserved SERVICE Bits" consisting of the latter half 9 (nine) bits, its use is reserved at present in anticipation of future use. With respect to frame data generated in conformity with the IEEE802.11, the scrambler as shown in FIG. 1 and the descrambler as shown in FIG. 2 are used to perform, as occasion demands, various controls according to output switching of transmission data inputted to the descrambler in accordance with "Scrambler Initialization", etc. to thereby establish synchronization between the scrambler and the descrambler. It is to be noted that, with respect to the technology according to the scramble/descramble system using PN series, there is a technology described in. e.g., the Japanese Patent Application Laid Open No. 1996-204613 publication.

As described above, in the communication system in conformity with the IEEE802.11 in which employment with respect to communication system of broad category is expected in future, it is prescribed that "0" of a predetermined number of bits are successively outputted to the scrambler of the transmitting unit at predetermined positions within frame in order to take synchronization between the scrambler and the descrambler. For this time period, data obtained by performing scramble processing with respect to "0" are transmitted from the transmitting unit to the receiving unit. However, there is the problem that when transmission data for synchronization outputted from the transmitting unit is compared with data caused to undergo transmission by using ordinary data field, although such transmission data is data having predominance which can endow various attributes on the basis of the fact that positions on the frame are established, there is failure or lack in effective utilization of data as the communication system because there is no possibility that such transmission data are used except for establishing synchronization.

DISCLOSURE OF THE INVENTION

An object of the present invention is to provide a novel data processing apparatus and a novel data reception processing apparatus which can solve technical problems that prior arts as described above have.

Another object of the present invention is to provide a data processing apparatus and a data reception processing apparatus which can realize effective utilization of data caused to undergo transmission in such widely used communication systems in conformity with, e.g., IEEE802.11.

The present invention proposed in order to attain objects as described above is directed to a data processing apparatus adapted for performing scramble processing of transmit data, which comprises: scramble operation processing means including plural stages of shift registers and a cyclic operation processing circuit for performing a predetermined operation processing on the basis of a hold value of a predetermined stage of the shift registers and transmit data to generate scramble-processed data, and to sequentially input the scramble-processed data to the input stage of the shift registers; data generating means for generating bit data of a predetermined pattern; and switching means supplied with the scramble-processed data and the bit data of the predetermined pattern generated by the data generating means to select the bit data of the predetermined pattern at the time of synchronization processing of the transmit data, and to select the scramble-processed data at the time except for the above to output the data thus selected as scrambler output data.

The data generating means constituting the data processing apparatus is caused to be of the configuration to load bit data of a predetermined pattern into the shift register at the time of synchronization processing of transmit data.

Another data processing apparatus according to the present invention is directed to a data processing apparatus adapted for performing scramble processing of transmit data, which comprises: cyclic code generating means for generating cyclic bit data train of a predetermined period; EXOR operation means for sequentially performing EXOR operation of cyclic bit data train with respect to the transmit data to output the scrambled-processed data; data generating means for generating bit data of a predetermined pattern; and switching means supplied with the scramble-processed data and the bit data of the predetermined pattern generated by the data generating means to select the bit data of the predetermined pattern at the time of synchronization processing of the transmit data, and to select the scramble-processed data at the time except for the above to output the data thus selected as scrambler output data.

Here, the switching means used in the data processing apparatus according to the present invention is caused to be of the configuration in which in the case where a predetermined synchronization pattern data inserted into transmit data for the purpose of taking synchronization of transmit data is inserted in the transmit data, the switching means serves to select bit data of a predetermined pattern to output the bit data thus selected as scrambler output data.

Moreover, the data generating means is caused to be of the configuration to generate bit data of a predetermined pattern to which predetermined information is assigned in advance.

Further, the present invention is directed to a data reception processing apparatus adapted for performing descramble processing of receive data, which comprises: detecting means for detecting bit data of a predetermined pattern for synchronization from the receive data; and descramble operation processing means including plural stages of shift registers and a cyclic operation processing circuit for performing a predetermined operation processing on the basis of a hold value of a predetermined stage of the shift registers and the receive data to output descramble-processed data, and to sequentially input the descramble-processed data to the input stage of the shift registers. In the case where bit data of a predetermined pattern is detected, the detecting means loads the bit data of the predetermined pattern into the shift register.

The detecting means used in the data reception processing apparatus is caused to be of the configuration to specify information assigned in advance to the bit data of the predetermined pattern.

Still further objects of the present invention and practical merits obtained by the present invention will become more apparent from the description of the embodiments which will be given below with reference to the attached drawings.

BEST MODE FOR CARRYING OUT THE INVENTION

Practical embodiments of the present invention will now be explained with reference to the attached drawings.

First, a scrambler to which the present invention is applied will be explained.

Figure 1:
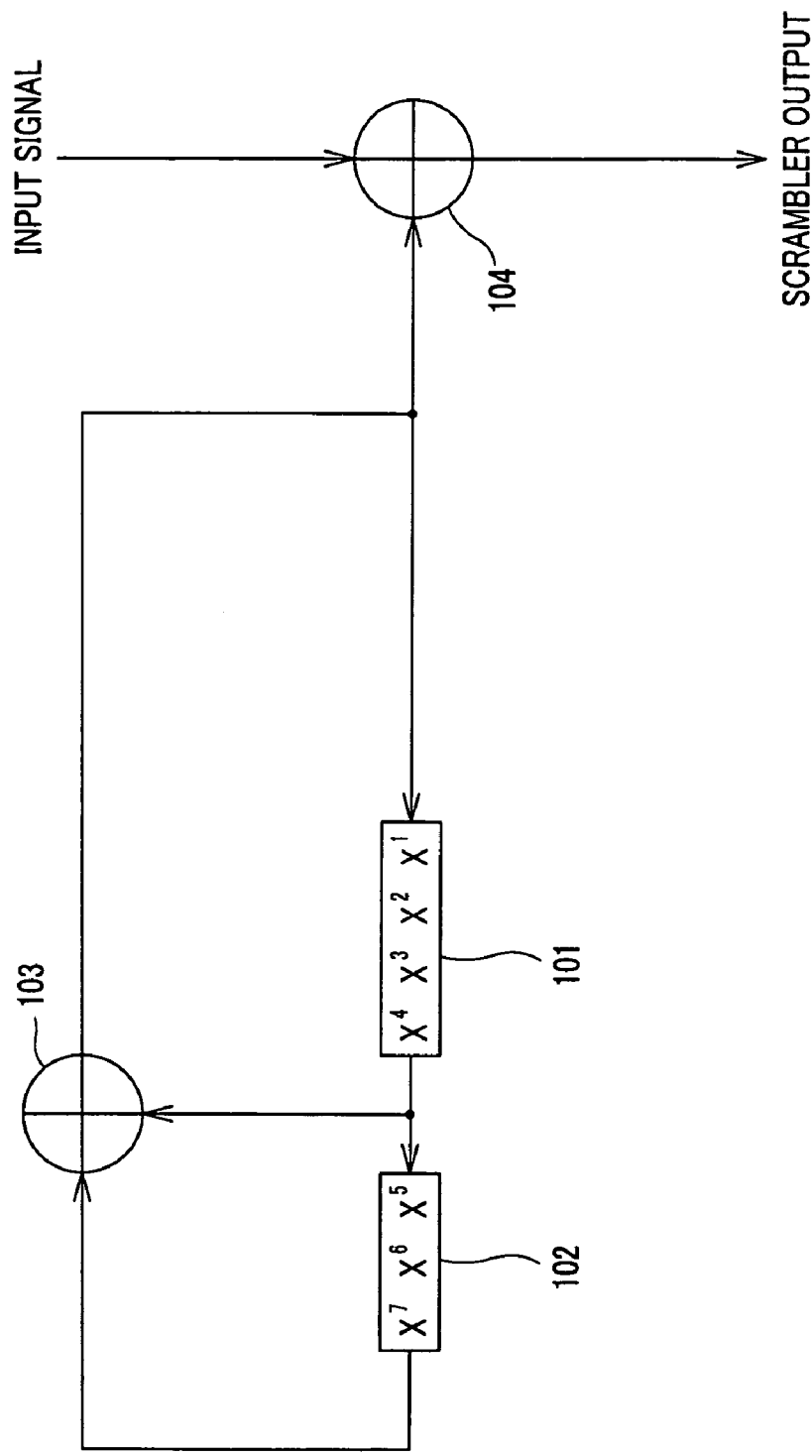
FIG. 1 is a block diagram showing one example of a data scrambler which outputs PN series.
Figure 2:
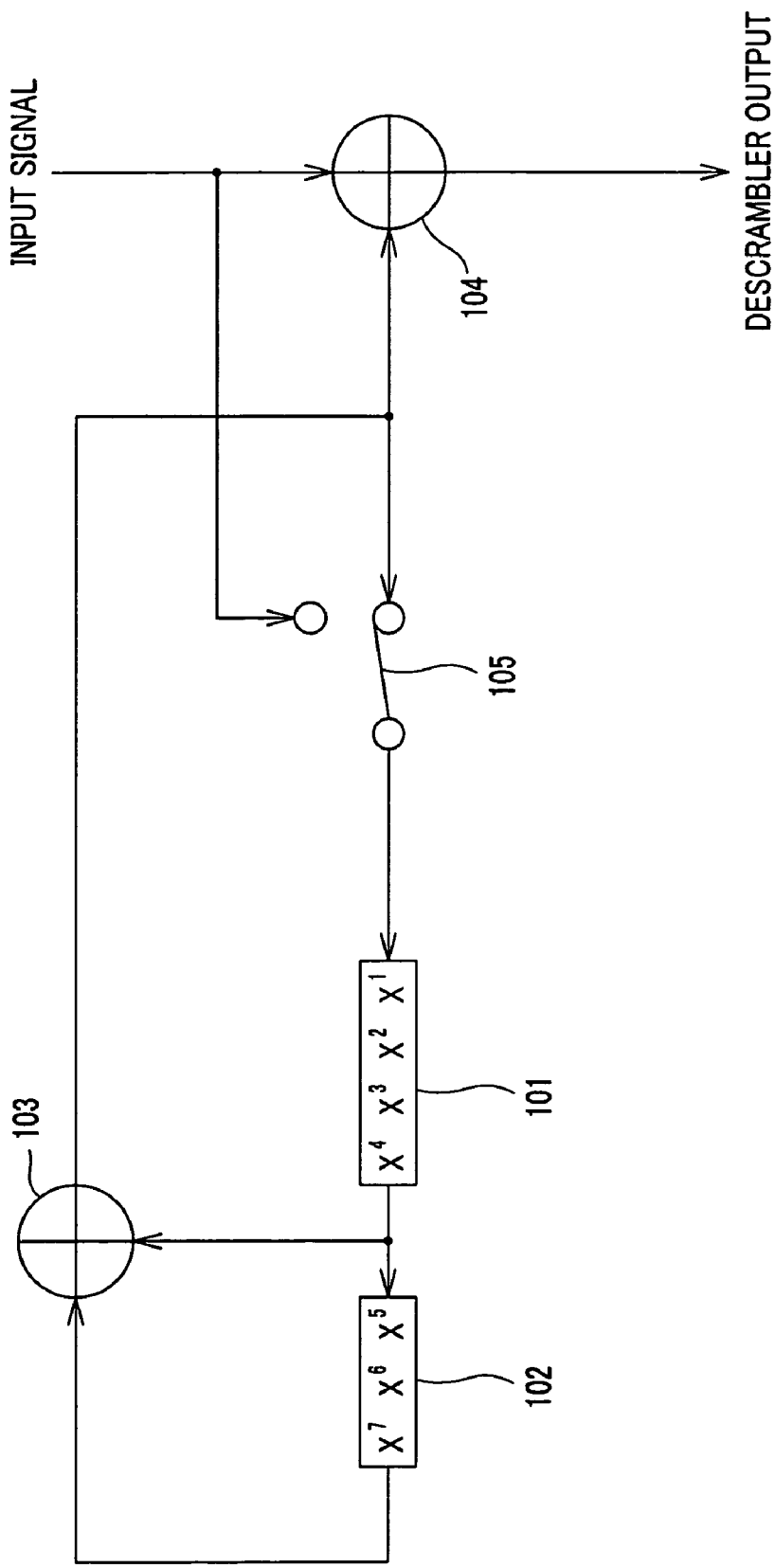
FIG. 2 is a block diagram showing the configuration of a conventional scrambler.
Figure 3:
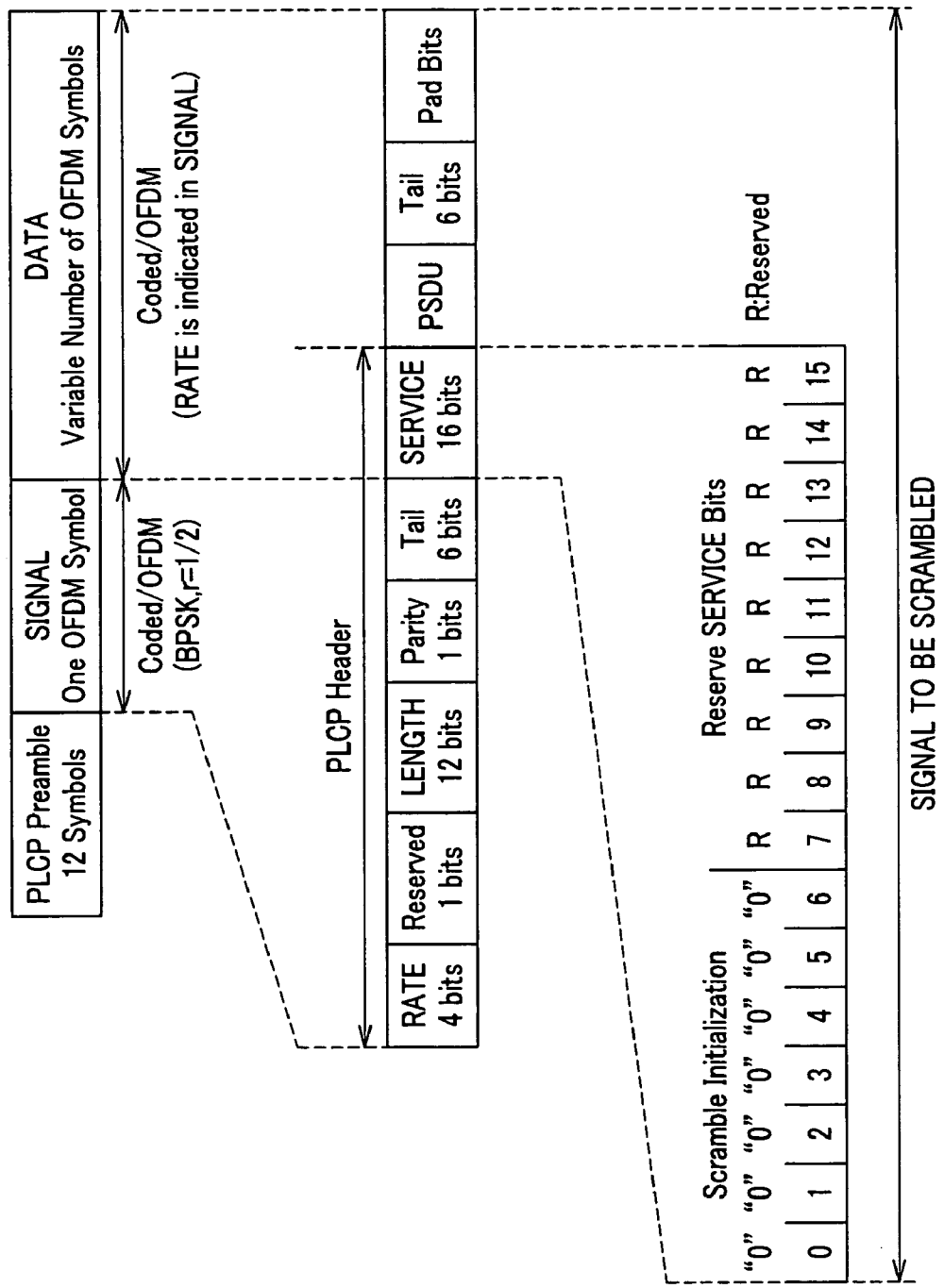
FIG. 3 is a view showing frame structure prescribed in IEEE802.11.
Figure 4:
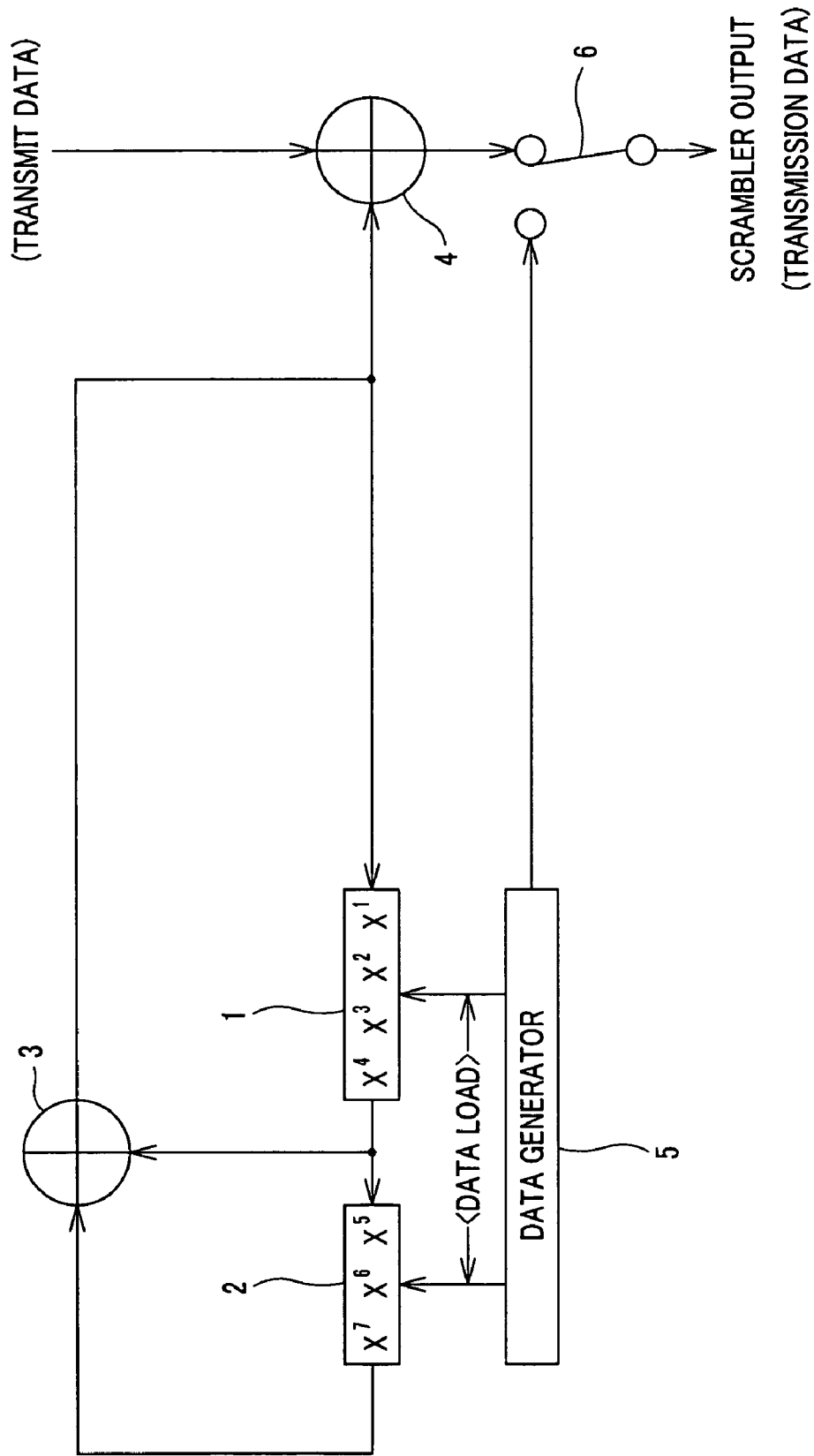
FIG. 4 is a block diagram showing the configuration of a scrambler to which the present invention is applied.

The scrambler to which the present invention is applied has a configuration as shown in FIG. 4. In FIG. 4, reference numeral 1 indicates a shift register of 4 (four) bits, reference numeral 2 indicates a shift register of 3 (three) bits of which input unit (stage) is connected to an output unit (stage) of the shift register 1, and reference numeral 3 indicates a modulo-2 adder supplied with bit data X4 which is output data of the shift register 1 and bit data X7 which is output data of the shift register 2 to perform EXOR operation. Further, reference numeral 4 indicates an adder supplied with output data of the adder 3 and transmit data inputted to the scrambler to perform EXOR operation, reference numeral 5 indicates a data generator including plural parallel output units for outputting, in parallel, bit data to a shift register of 7 (seven) bits composed of the shift register 1 and the shift register 2 and a serial output unit for separately serially outputting bit data thereto, and reference numeral 6 indicates a switch supplied with output data from the adder 4 and output data from the data generator 5 to selectively output either one of them as scrambler output data. The output data of the adder 3 is also inputted to the shift register 1. In addition, random number generating means for outputting random bit data train at a predetermined period is composed of the shift register 1, the shift register 2 and the adder 3.

It is to be noted that, in the following explanation, data inputted to the scrambler is called "transmit data", data outputted from the scrambler and inputted to the descrambler is called "transmission data", and data outputted from the descrambler is called "receive data" to thereby discriminate between these data as occasion demands.

Figure 5:
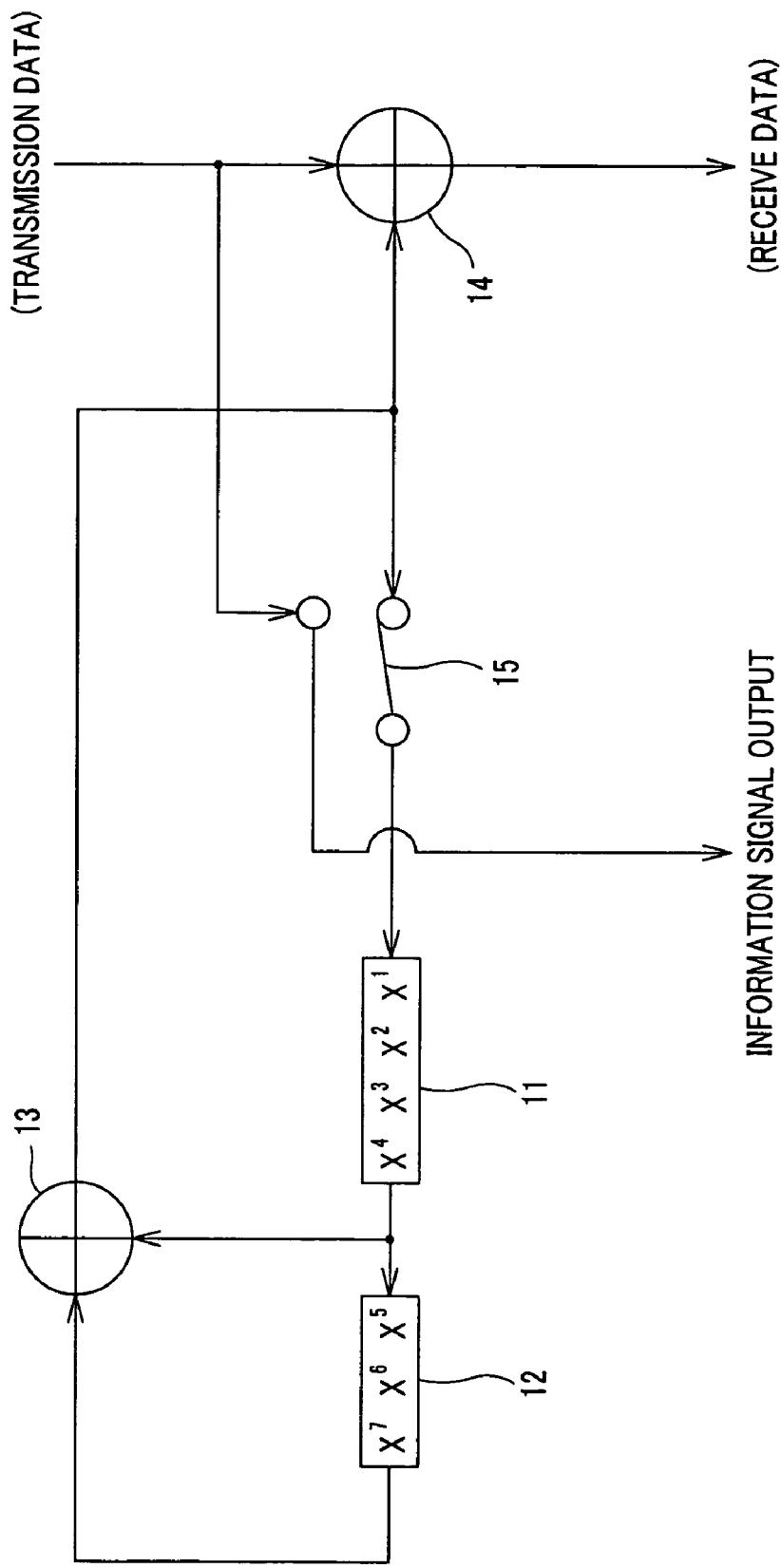
FIG. 5 is a block diagram showing the configuration of a descrambler to which the present invention is applied.

FIG. 5 is a view showing the configuration of a descrambler to which the present invention is applied. In FIG. 5, reference numeral 11 indicates a shift register of 4 (four) bits, reference numeral 12 indicates a shift register of 3 (three) bits, and reference numeral 13 indicates a modulo-2 adder supplied with bit data X4 and bit data X7 to perform EXOR operation. Further, reference numeral 14 indicates an adder supplied with output data from the adder 13 and transmission data inputted to the descrambler to perform EXOR operation, and reference numeral 15 indicates a switch for selectively outputting, to the shift register 11, either one of output data from the adder 13 and transmission data inputted to the descrambler. In this example, for the purpose of taking out transmission data without performing descramble processing thereof, there is provided a wiring path for separately taking out transmission data. In addition, random number generating means for outputting random bit data train at a predetermined period is composed of the shift register 11, the shift register 12 and the adder 13.

Then, the operation thereof will be explained. In the transmitting unit to which the present invention is applied, when data consisting of "0" successive by 7 (seven) bits, i.e., "Scrambler Initialization" is inputted to the scrambler for the purpose of taking synchronization between the scrambler of the transmitting unit and descrambler of the receiving unit, switching control of the switch 6 is performed by using CPU (control means) within the transmitting unit to output output data from the data generator 5 as scrambler output data. Thus, for a time period during which transmit data of 7 (seven) bits for establishing synchronization is inputted to the scrambler, transmission of output data from the data generator 5 is performed as transmission data for establishing synchronization. Moreover, after data input of 7 (seven) bits for establishing synchronization is completed, the same bit data train as bit data train of 7 (seven) bits which has been caused to undergo transmission through the switch 6 from the data generator 5 is outputted in parallel to the shift register 1 and the shift register 2, and is stored thereinto. In this instance, bit data train is outputted so that respective bit data which have been outputted in time series manner through the switch 6 result in bit data X7 to bit data X1 in order recited. Then, switching control of the switch 6 is performed in such a manner to output output data from the adder 4 as scrambler output data. By performing operations in a manner as described above, there is performed, from the transmitting unit, transmission of data obtained as the result of the fact that scramble processing is performed with respect to transmit data inputted to the scrambler after transmit data for establishing synchronization.

In the receiving unit to which the present invention is applied, for a time period during which transmission data of 7 (seven) bits for establishing synchronization is inputted to the descrambler by using CPU (control means) within the receiving unit, switching control of the switch 15 is performed so that transmission data is inputted to the shift register 11. In this instance, transmission data of 7 (seven) bits for establishing synchronization are sequentially inputted to the shift register of 7 (seven) bits composed of the shift register 11 and the shift register 12. Thus, at the time point when bit data for establishing synchronization of the seventh bit is inputted to the shift register 11, bit data train stored in the shift register of 7 (seven) bits within scrambler and bit data train stored in the shift register of 7 (seven) bits within the descrambler are equal to each other so that synchronization is taken. Then, switching control of the switch 15 is performed so that data outputted from the adder 13 is inputted to the shift register 11. After synchronization is taken, since the same scramble pattern is exerted, in the scrambler and the descrambler, on transmit data and transmission data respectively corresponding thereto, data transmission using the scramble/descramble system is performed. Moreover, with respect to transmission data of 7 (seven) bits for establishing synchronization, such transmission data is not only outputted to the shift register 11 through the switch 15, but also transmission data is taken out through a signal line separately provided. Accordingly, it is possible to take out, at the receiving unit, transmission data for establishing synchronization outputted from the data generator 5 within the scrambler. Thus, such transmission data is interpreted by CPU to have ability to obtain, e.g., information according to transmission characteristic, etc. Since arbitrary data except for data in which 7 (seven) bits all take "0" can be used as transmission data for establishing synchronization. From this fact, it is possible to easily use data outputted from the data generator 5 for use purpose except for establishment of synchronization.

As described above, the communication apparatus to which the present invention is applied is caused to be of the configuration adapted to perform switching control of the switch 6 so that output data from the data generator 5 is outputted as scrambler output data for a time period during which transmit data for establishment of synchronization is inputted to the scrambler by using the scrambler caused to be of the configuration including shift register of 7 (seven) bits composed of shift register 1 and shift register 2, adder 3, adder 4, data generator 5 constituted so that data can be loaded into the shift register and the same bit data train as the bit data train separately loaded into the shift register can be outputted, and switch 6 which selectively outputs, as scrambler output data, either one of output data of the adder 4 and output data of the data generator 5. Accordingly, transmission of data outputted from the data generator 5 is performed as transmission data for establishment of synchronization. From this fact, data for establishment of synchronization can be used for use purpose except for establishment of synchronization. Thus, effective utilization of data caused to undergo transmission in widely used communication system in conformity with, e.g., IEEE802.11 can be realized.

Moreover, in the receiving unit to which the present invention is applied, there is employed a configuration adapted to take out transmission data for establishment of synchronization and adapted so that if bit data train indicating information according to transmission characteristic, etc. is included in transmission data for establishment of synchronization, such transmission data is interpreted to obtain information. Accordingly, data for establishment of synchronization can be used for use purpose except for establishment of synchronization. As a result, effective utilization of data caused to undergo transmission in widely used communication system in conformity with, e.g., IEEE802.11 can be realized.

It is to be noted that since scramble is not applied to transmission data for establishment of synchronization outputted from the data generator 5 with respect to the above-described transmitting unit having scrambler, it is not necessarily required to use data in which "0" are successive by a predetermined number of bits as transmit data for establishment of synchronization inputted to the scrambler, and it is possible to input, to the scrambler, transmit data for establishment of synchronization having an arbitrary bit pattern. From this fact, the above-mentioned transmitting unit can be applied to the communication system in conformity with other various standards having frame format different from that of the IEEE802.11. Further, while control is performed in the above-mentioned first embodiment such that output data from the data generator 5 is outputted as scrambler output data for a time period during which "0" successive by 7 (seven) bits are inputted to the scrambler for establishment of synchronization, control may be also performed so as to store the same bit data train at the scrambler within the transmitting unit and the descrambler within the receiving unit to perform transmission of output data from the data generator 5 also at a time period before scramble/descramble processing is started.

Moreover, while it is also conceivable that since scramble is not applied to output data from the data generator 5, transmission of significant information is performed as it is, transmission of data obtained by performing encryption based on a predetermined system with respect to significant information may be also performed for the purpose of prevention of leakage of information, etc.

Further, while shift register composed of shift register 1 and shift register 2 is caused to have 7 (seven) bits in the above-described example, this configuration is caused to correspond to the fact that "Scrambler Initialization" of frame format prescribed by the IEEE802.11 is 7 (seven) bits. Accordingly, if there is employed a configuration to generate PN series, the numbers of bits of the shift register 1 and the shift register 2 may be suitably selected in accordance with the frame format of inputted transmit data. In addition, while a circuit adapted to generate PN series is constituted by two shift registers 1, 2 and one adder 3 in the first embodiment, there may be employed other circuit configurations of various forms adapted to perform function to output random bit data train at a predetermined period.

Figure 6:
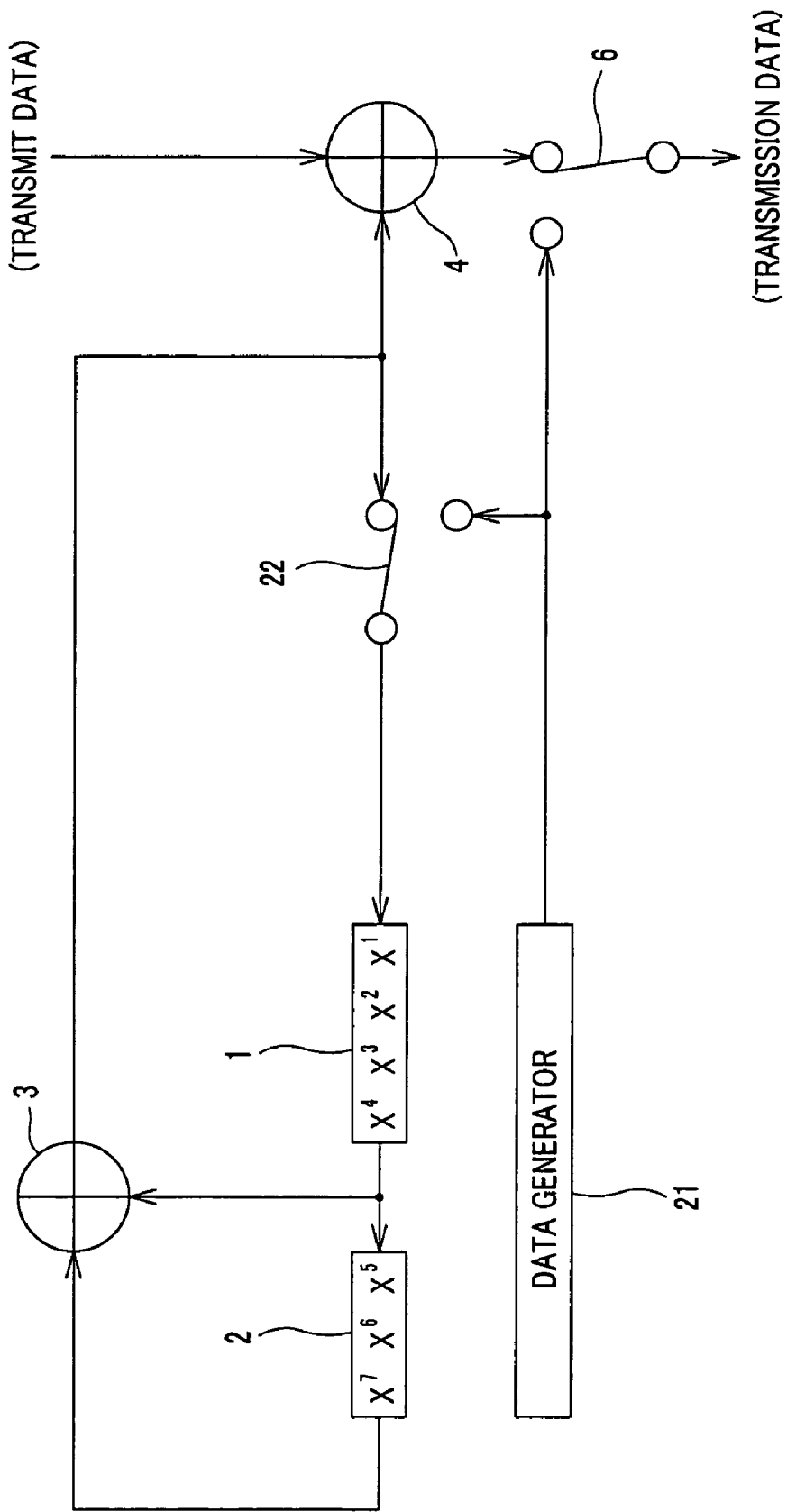
FIG. 6 is a block diagram showing a modified example of the scrambler to which the present invention is applied.

FIG. 6 is a view showing a modified example of the above-described scrambler according to the present invention. In FIG. 6, the same reference numerals are respectively attached to components common to those shown in FIG. 4, and the detailed description thereof will be omitted.

In FIG. 6, reference numeral 21 indicates a data generator including a serial output unit adapted to serially output bit data, and reference numeral 22 indicates a switch for inputting either one of output data from the adder 3 and output data from the data generator 21 to selectively output the inputted one to the shift register 1.

Then, the operation of the scrambler shown in FIG. 6 will be explained. In the transmitting unit to which the present invention is applied, for a time period during which "Scrambler Initialization" for taking synchronization between the scrambler and the descrambler is inputted to the scrambler, switching control of switches 6 and 22 is performed by CPU within the transmitting unit to output output data from the data generator 21 as scrambler output data, and to output such output data to the shift register 1. Thus, output data from the data generator 21 are sequentially inputted to the shift register 1, and transmission of the output data is performed from the transmitting unit. Then, switching control of the switch 6 is performed by the CPU6 within the transmitting unit to output the output data from the adder 4 as scrambler output data, and switching control of the switch 22 is performed to output the output data from the adder 3 to the shift register 1. Thus, transmission of data obtained by performing scramble processing with respect to data inputted to the scrambler after "Scrambler Initialization" is performed from the transmitting unit. It is to be noted that since the operation of the receiving unit is similar to that of the above-described example, reference is made to its explanation and the detailed explanation thereof will be omitted.

By using the scrambler shown in FIG. 6, the effects/advantages equivalent to those of the above-described scrambler shown in FIG. 4 are obtained or attained, and there is employed configuration provided with switch 22 to input serial output data from the data generator 21 and output data from the adder 3 to selectively output either one of data to the shift register 1. Accordingly, it is sufficient to provide only one output unit to serially output bit data at the data generator 21. Thus, data generator having simple configuration is used, thereby making it possible to simplify the circuit configuration of the entirety of the scrambler.

Then, scrambler of another example of the present invention will be explained with reference to FIG. 7.

Figure 7:
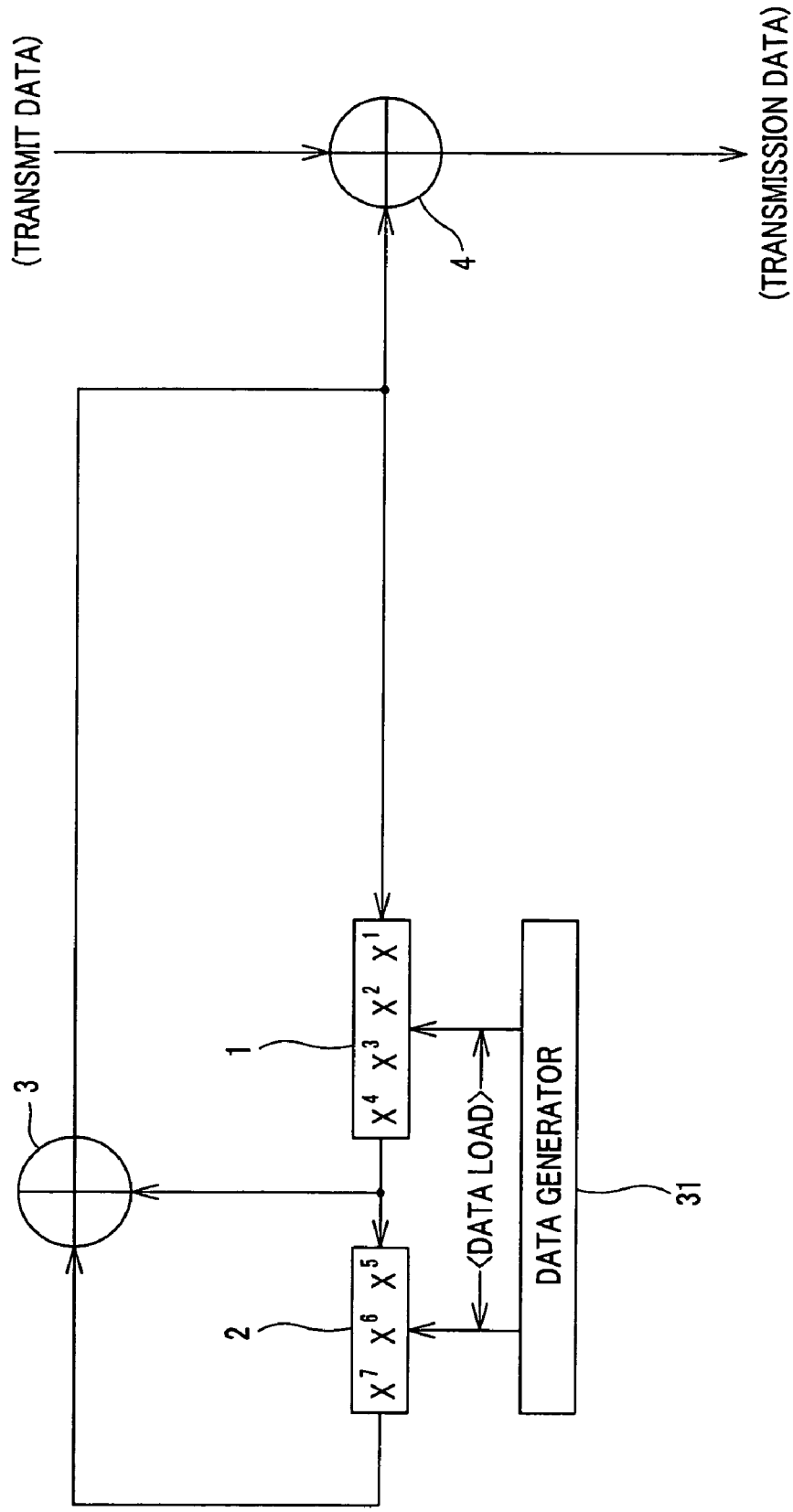
FIG. 7 is a block diagram showing another example of the scrambler to which the present invention is applied.

In FIG. 7, common reference numerals are respectively attached to portions common to those of the example shown in FIG. 4, and the detailed explanation thereof will be omitted.

In FIG. 7, reference numeral 31 indicates a data generator having plural parallel output units to output, in parallel, bit data to a shift register of 7 (seven) bits composed of shift register 1 and shift register 2. It is to be noted that when the scrambler shown in FIG. 7 is compared with the scrambler shown in FIG. 4, switch 6 for outputting output data from the data generator 31 as scrambler output data is omitted. In addition, since the same descrambler as the above-described descrambler is used with respect to the descrambler, its explanation will be omitted.

Then, the operation thereof will be explained. In the transmitting unit to which the present invention is applied, bit data train is outputted in parallel from the data generator 31 to the shift registers 1 and 2 on the basis of control by CPU within the transmitting unit before "Scramble Initialization" for taking synchronization between the scrambler and the descrambler is inputted to the scrambler to store the bit data train into the shift registers 1 and 2 as initial data. For a time period during which "Scrambler Initialization" is inputted to the scrambler, adder 4 performs EXOR operation of "0" given as transmit data and output data of the adder 3 to sequentially output operation (arithmetic) data. Since one bit data subject to EXOR operation is "0", this operation (arithmetic) data becomes equal to output data from the adder 3.

Since the scrambler of this example operates in a manner as described above, e.g., reference table is used to set initial data so that transmission data of 7 (seven) bits results in desired bit data train, thereby making it possible to use transmission data for establishment of synchronization outputted from the scrambler for use purpose except for establishment of synchronization. It is to be noted that since the operation of the descrambler within the receiving unit is the same as that of the above-described example, its explanation will be omitted.

As stated above, transmitting unit of another example of the present invention performs a control so as to output bit data train from the data generator 31 before transmit data for establishment of synchronization is inputted to the scrambler to store the bit data train into the shift registers 1 and 2 by using scrambler caused to be of the configuration including shift register of 7 (seven) bits composed of shift registers 1 and 2, adder 3, adder 4 and data generator 31 constituted so that data can be loaded into the shift register. Accordingly, initial data outputted from the data generator 31 to the shift registers 1 and 2 is set as occasion demands so that data of 7 (seven) bits outputted from the adder 3 results in desired transmission data so that transmission data for establishment of synchronization can be used for use purpose except for establishment of synchronization. Accordingly, in the widely used communication system in conformity with, e.g., IEEE802.11, effective utilization of data caused to undergo transmission can be realized. It is to be noted that the circuit which generates PN series may take various forms in the same manner as the above-described example.

Figure 8:
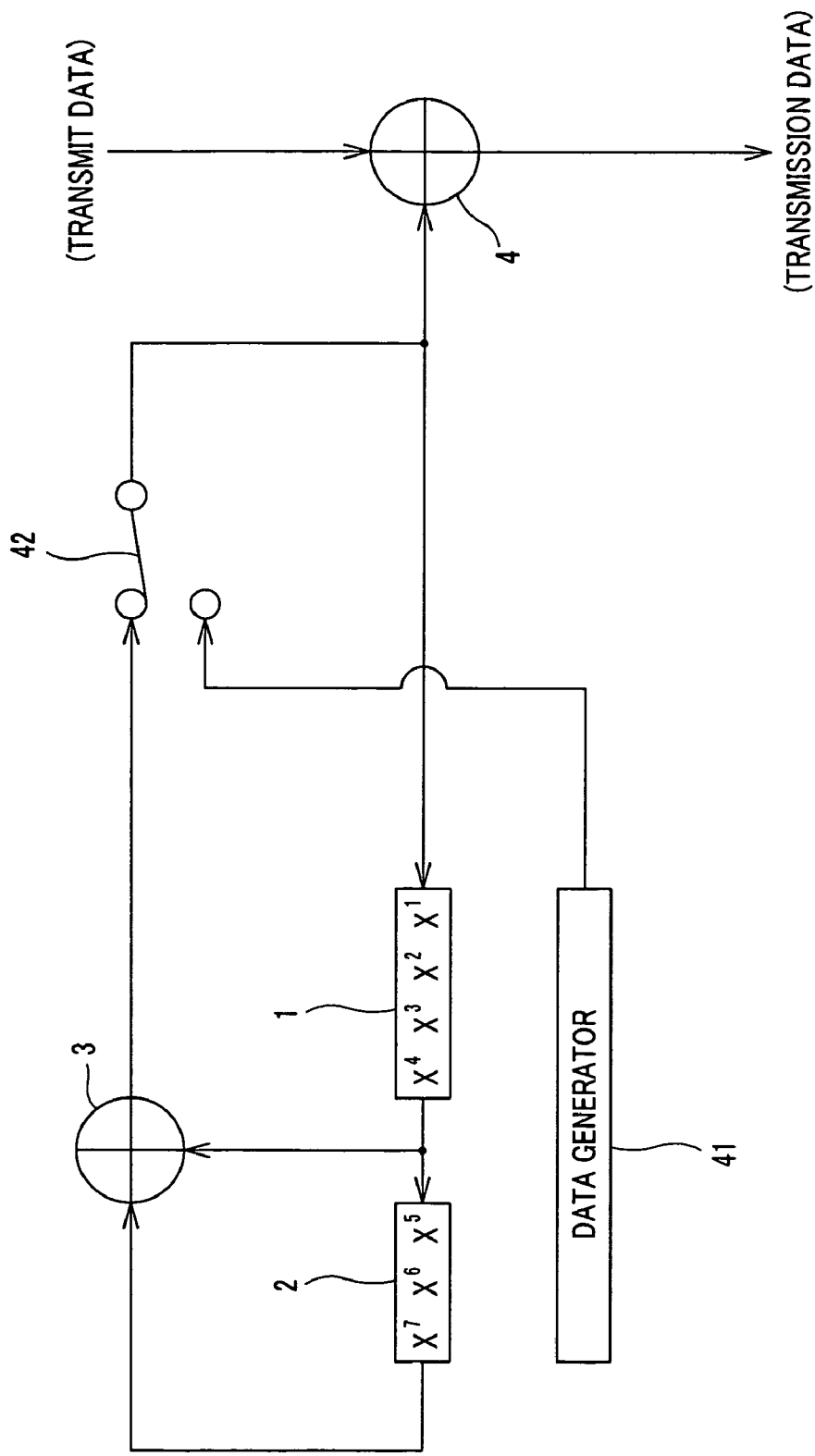
FIG. 8 is a block diagram showing a further example of the scrambler to which the present invention is applied.

Then, a further example of the scrambler according to the present invention will be explained. This scrambler has a configuration as shown in FIG. 8. The same reference numerals are respectively attached to portions (components) common to those of the previously described scrambler shown in FIG. 4, and the detailed explanation thereof will be omitted.

In FIG. 8, reference numeral 41 indicates a data generator including a serial output unit to serially output bit data, and reference numeral 42 indicates a switch supplied with output data from the adder 3 and output data from the data generator 41 to selectively output either one of them to the shift register 1 and the adder 4. It is to be noted that since the same descrambler as the previously described descrambler is used with respect to descrambler, its explanation will be omitted.

Then, the operation thereof will be explained. In the transmitting unit to which the prevent invention is applied, for a time period during which "Scrambler Initialization" for taking synchronization between scrambler and descrambler is inputted to the scrambler, switching control of the switch 42 is performed by CPU within the transmitting unit to output output data from the data generator 41 to the shift register 1 and the adder 4. Thus, bit data train outputted from the data generator 41 is inputted to shift register of 7 (seven) bits composed of shift register 1 and shift register 2, and transmission of the bit data train is performed from the scrambler on the basis of the fact that EXOR operation value of bit data X and "0" results in bit data X as described above so that the bit data train is inputted to the shift register of 7 (seven) bits within the receiving unit.

As stated above, also in the transmitting unit of the further example of the present invention, scrambler caused to be of the configuration including shift register of 7 (seven) bits composed of shift register 1 and shift register 2, adder 3, adder 4, data generator 41 for serially outputting bit data, and switch 42 for performing switching between output data from the adder 3 and output data from the data generator 41 is used to perform switching control of the switch 42 so that output data from the data generator 41 is inputted to the shift register 1 and the adder 4 for a time period during which transmit data for establishment of synchronization is inputted to the scrambler. Accordingly, transmission of output data from the data generator 41 is performed as transmission data for establishment of synchronization. From this fact, data for establishment of synchronization can be used for use purpose except for establishment of synchronization. Thus, effective utilization of data caused to undergo transmission in widely used communication system in conformity with, e.g., IEEE802.11 can be advantageously realized.

It is to be noted that the circuit adapted for generating PN series may take various forms similarly to the scramblers of the previously described examples also in this example.

It should be noted that the above-described respective scramblers, the transmitting unit and the receiving unit to which the present invention is applied do not limit the present invention, and various changes, alternative constructions and/or equivalents may be implemented without departing from the gist of the present invention.

INDUSTRIAL APPLICABILITY

The data processing apparatus according to the present invention is adapted to input scramble-processed data and bit data of a predetermined pattern generated by data generating means to select bit data of the predetermined pattern at the time of synchronization processing of transmit data, and to select the scramble-processed data at the time except for the above to output the data thus selected as scrambler output data. Accordingly, transmission of data outputted from the data generating means can be performed as transmission data for establishment of synchronization without being affected by bit pattern of transmit data to be scramble-processed. From this fact, data for establishment of synchronization can be used for use purpose except for establishment of synchronization. Thus, in widely used communication system having data transmission format in which it is prescribed that data for establishment of synchronization is scramble-processed at predetermined position within frame, effective utilization of data caused to undergo transmission can be realized.

In addition, in the data reception processing apparatus according to the present invention, in the case where bit data of a predetermined pattern for synchronization is detected from receive data, the bit data of the predetermined pattern is loaded into the shift register. Accordingly, data for establishment of synchronization can be used for use purpose except for establishment of synchronization. Thus, in widely used communication system having data transmission format in which it is prescribed that data for establishment of synchronization is inputted to the descrambler at predetermined position within frame, effective utilization of data caused to undergo transmission can be realized.

The invention claimed is:

1. A data processing apparatus adapted for performing scramble processing of transmit data, the data processing apparatus comprising:
a random number generating circuit to generate a random bit data train, said random number generating circuit having a first shift register, a second shift register, and a first adder, said random number generating circuit being arranged such that (i) an output stage of the first shift register is directly coupled to an input stage of the second shift register and to the first adder such that during operation an output from the first shift register is supplied to the input stage of the second shift register and the same output from the first shift register is supplied to an input of the first adder, and (ii) an output stage of the second shift register is coupled to the first adder such that during operation an output of the second shift register is supplied to another input of the first adder;
a data generator to generate bit data of a predetermined pattern and to supply the generated bit data of the predetermined pattern therefrom, said data generator being separate from the random number generating circuit;
a second adder arranged to receive an output of the first adder and the transmit data and being operable to generate scramble-processed data therefrom;
a first switch arranged to receive the scramble-processed data from the second adder and the bit data of the predetermined pattern from the data generator, said first switch being operable to select the bit data of the predetermined pattern at the time of synchronization processing of the transmit data and to select the scramble-processed data when synchronization processing of the transmit data is not performed and to output the data selected.

2. The data processing apparatus according to claim 1, in which the data generator is further arranged to supply the generated bit data of the predetermined pattern to the first shift register and the second shift register, and in which said random number generating circuit is further arranged such that the output of the first adder is supplied to an input stage of the first shift register, and in which the generated bit data of the predetermined pattern supplied to the first switch is the same as the generated bit data of the predetermined pattern supplied to the first shift register and the second shift register.

3. The data processing apparatus according to claim 1, in which the first adder is a modulo 2 adder, and in which the first adder and the second adder are each operable to perform an exclusive-or operation.

4. The data processing apparatus according to claim 1, further comprising a second switch arranged to receive the output of the first adder and the bit data of the predetermined pattern and being operable to output a selected one of the output of the first adder and the bit data of the predetermined pattern to an input stage of the first shift register, and in which the generated bit data of the predetermined pattern supplied to the first switch is the same as the generated bit data of the predetermined pattern supplied to the second switch.

5. The data processing apparatus according to claim 4, in which the first adder is a modulo 2 adder, and in which the first adder and the second adder are each operable to perform an exclusive-or operation.

6. A data processing apparatus adapted for performing scramble processing of transmit data, the data processing apparatus comprising:
a random number generating circuit to generate a random bit data train, said random number generating circuit having a first shift register, a second shift register, and a first adder, said random number generating circuit being arranged such that (i) an output stage of the first shift register is directly coupled to an input stage of the second shift register and to the first adder such that during operation an output from the first shift register is supplied to the input stage of the second shift register and the same output from the first shift register is supplied to an input of the first adder, and (ii) an output stage of the second shift register is directly coupled to the first adder such that during operation an output of the second shift register is supplied to another input of the first adder;
a data generator to generate bit data of a predetermined pattern and to supply the generated bit data of the predetermined pattern therefrom;
a switch arranged to receive an output of the first adder and the generated bit data of the predetermined pattern, said switch being operable to select the bit data of the predetermined pattern at the time of synchronization processing of the transmit data and to select the output of the first adder when synchronization processing of the transmit data is not performed and to output the data selected; and
a second adder arranged to receive the transmit data and the data selected outputted from the switch and being operable to generate scramble-processed data therefrom.

* * * * *